United States Patent
Palombini

(10) Patent No.: US 11,465,529 B1
(45) Date of Patent: Oct. 11, 2022

(54) METHODS AND SYSTEMS FOR OPTIMIZING BATTERY RECHARGE MANAGEMENT FOR USE WITH AN ELECTRIC VERTICAL TAKE-OFF AND LANDING AIRCRAFT

(71) Applicant: BETA AIR, LLC, South Burlington, VT (US)

(72) Inventor: John Charles Palombini, Charlotte, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/361,709

(22) Filed: Jun. 29, 2021

(51) Int. Cl.
| | |
|---|---|
| *B60L 53/68* | (2019.01) |
| *B64C 29/00* | (2006.01) |
| *B64D 41/00* | (2006.01) |
| *B60L 58/10* | (2019.01) |
| *B60L 58/26* | (2019.01) |
| *B60L 53/30* | (2019.01) |
| *G06N 20/00* | (2019.01) |
| *B60L 53/62* | (2019.01) |

(52) U.S. Cl.
CPC ............. *B60L 53/68* (2019.02); *B60L 53/305* (2019.02); *B60L 53/62* (2019.02); *B60L 58/10* (2019.02); *B60L 58/26* (2019.02); *B64C 29/00* (2013.01); *B64D 41/00* (2013.01); *G06N 20/00* (2019.01); *B60L 2200/10* (2013.01)

(58) Field of Classification Search
CPC ........ B64D 41/00; G06N 20/00; B64C 29/00; B60L 53/68; B60L 53/62; B60L 53/305; B60L 58/10; B60L 58/26; B60L 2200/10
See application file for complete search history.

(56) References Cited

U.S. PATENT DOCUMENTS

| 8,469,306 B2 | 6/2013 | Kuhn, Jr. |
| 9,139,310 B1 | 9/2015 | Wang |

(Continued)

FOREIGN PATENT DOCUMENTS

WO     2019211875 A1    11/2019

OTHER PUBLICATIONS

Title: Hydrogen Fuel Cell and Battery Hybrid Architecture for Range Extension of Electric VTOL (eVTOL) Aircraft by: Ng, Wanyi Date: Jan. 2021.

*Primary Examiner* — Tyler J Lee
(74) *Attorney, Agent, or Firm* — Caldwell Intellectual Property Law

(57) ABSTRACT

Aspects relate to methods and systems for optimizing battery recharge management for use with an electric vertical take-off and landing aircraft. An exemplary system includes an electric vertical take-off and landing (eVTOL) aircraft comprising at least battery mechanically coupled to the eVTOL aircraft and configured to power at least an aircraft component of the eVTOL aircraft, wherein the at least a battery comprises a plurality of battery cells, and at least a sensor, configured to measure battery data associated with the at least a battery, and a server remote from the eVTOL and in communication with the at least a sensor, wherein the server is configured to receive the battery data from the at least a sensor, receive mission data associated with a planned flight mission of the eVTOL aircraft, and generate a recharge time as a function of the battery data and the mission data.

18 Claims, 10 Drawing Sheets

(56) References Cited

U.S. PATENT DOCUMENTS

| | | | |
|---|---|---|---|
| 9,376,208 B1 | 6/2016 | Gentry | |
| 9,434,267 B2 | 9/2016 | Wang | |
| 9,567,088 B2* | 2/2017 | Godlasky | B64C 39/024 |
| 9,592,744 B2 | 3/2017 | Zhao | |
| 10,137,983 B2 | 11/2018 | Horn | |
| 10,287,013 B2* | 5/2019 | Starace | B64C 3/56 |
| 10,453,348 B2 | 10/2019 | Speasl | |
| 10,479,223 B2 | 11/2019 | Demont | |
| 10,501,195 B2 | 12/2019 | Wang | |
| 10,562,623 B1* | 2/2020 | Sloan | B64C 39/024 |
| 10,630,082 B1 | 4/2020 | Gu | |
| 2019/0235502 A1* | 8/2019 | Lindsey | B64C 29/00 |
| 2019/0241274 A1 | 8/2019 | Hunkel | |
| 2019/0339334 A1* | 11/2019 | Mikolajczak | G01R 31/392 |
| 2021/0078714 A1 | 3/2021 | Demont | |

\* cited by examiner

METHODS AND SYSTEMS FOR OPTIMIZING BATTERY RECHARGE MANAGEMENT FOR USE WITH AN ELECTRIC VERTICAL TAKE-OFF AND LANDING AIRCRAFT

FIELD OF THE INVENTION

The present invention generally relates to the field of electric vehicles and electric vehicle components. In particular, the present invention is directed to methods and systems for optimizing battery recharge management for use with an electric vertical take-off and landing aircraft.

BACKGROUND

Unlike fluid-fueled aircraft, electric aircraft repowering does not entail simple refueling (or filling) of depleted fuel stores. Instead, may electric aircraft refuel by recharging one or more batteries. Complications and inefficiencies arise do to the more complex nature of recharging compared to refueling.

SUMMARY OF THE DISCLOSURE

In an aspect a system for optimizing battery recharge management for use with an electric vertical take-off and landing aircraft includes an electric vertical take-off and landing (eVTOL) aircraft comprising at least battery mechanically coupled to the eVTOL aircraft and configured to power at least an aircraft component of the eVTOL aircraft, wherein the at least a battery comprises a plurality of battery cells, and at least a sensor, configured to measure battery data associated with the at least a battery, and a server remote from the eVTOL and in communication with the at least a sensor, wherein the server is configured to receive the battery data from the at least a sensor, receive mission data associated with a planned flight mission of the eVTOL aircraft, and generate a recharge time as a function of the battery data and the mission data.

In another aspect a method of optimizing battery recharge management for use with an electric vertical take-off and landing aircraft includes measuring, using at least a sensor associated with at least a battery mechanically coupled to an electric vertical take-off and landing (eVTOL) aircraft, battery data associated with the at least a battery, wherein the at least a battery comprises a plurality of battery cells, receiving, using a server remote from the eVTOL and in communication with the at least a sensor, the battery data, receiving, using the server, mission data associated with a planned flight mission of the eVTOL aircraft, and generating, using the server, a recharge time as a function of the battery data and the mission data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for optimizing battery recharge management for use with an electric vertical take-off and landing aircraft. In an embodiment, a server is configured to receive battery data from at least a sensor and generate a recharge time as a function of the battery data and/or flight mission data.

Aspects of the present disclosure can be used to generate a predicted charge time required to safely charge a battery in anticipation of a planned flight mission. Aspects of the present disclosure can also be used to generate a battery cooling time. This is so, at least in part, because overused batteries are at risk over overheating and thermal runaway; in some embodiments, a generated recharge time may include a cooling time within which battery should cool to a usable temperature.

Aspects of the present disclosure allow for eVTOL aircraft to recharged according to state of deterioration of one or more batteries as well as planned flight missions. Exemplary embodiments illustrating aspects of the present disclosure are described below in the context of several specific examples.

Figure 1:
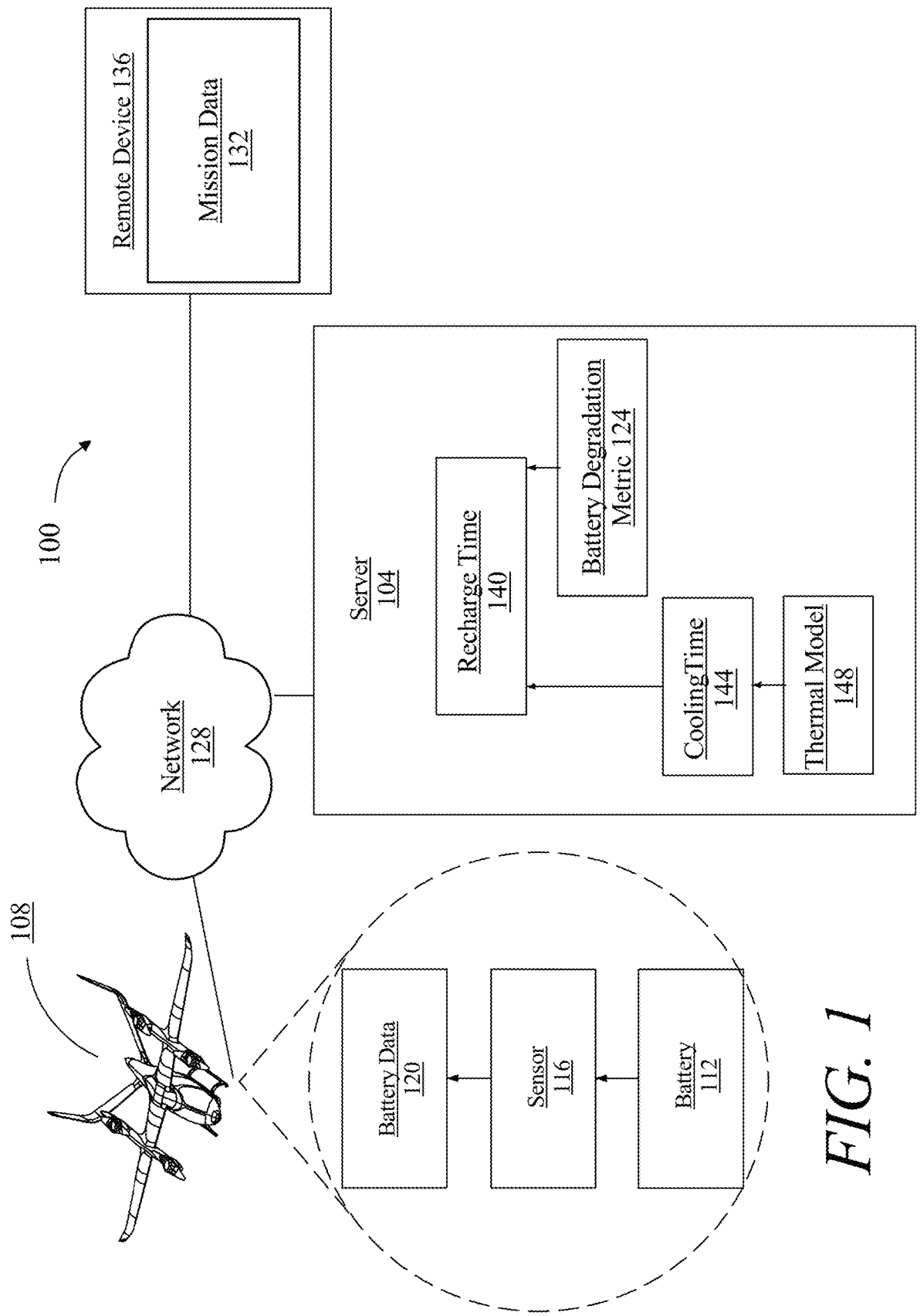
FIG. 1 is a block diagram illustrating an exemplary system for optimizing battery recharge management for use with an electric vertical take-off and landing aircraft.

Referring now to FIG. 1, an exemplary embodiment of a system 100 for optimizing battery recharge management for use with an electric vertical take-off and landing aircraft is illustrated. System includes a server 104. As used in this disclosure, a "server" is a computing device that is communicatively connected to at least another device by way of at least a network. In some cases, a server may be connected by way of a wide area network and/or Internet. Alternatively or additionally, server may be connected by way of a local area network, a controller area network, and/or a virtual private network. Server 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Server 104 may include a single computing device operating independently, or may include two or more computing device operating in concert, in parallel, sequentially or the like; two or more computing devices may be included together in a single computing device or in two or more computing devices. Server 104 may interface or communicate with one or more additional devices as described below in further detail via a network interface device. Network interface device may be utilized for connecting Server 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Server 104 include but is not limited to, for example, a computing device or cluster of computing devices in a first location and a second computing device or cluster of computing devices in a second location. Server 104 may include one or more computing devices dedicated to data storage, security, distribution of traffic for load balancing, and the like. Server 104 may distribute one or more computing tasks as described below across a plurality of computing devices of computing device, which may operate in parallel, in series, redundantly, or in any other manner used for distribution of tasks or memory between computing devices. Server 104 may be implemented using a "shared nothing" architecture in which data is cached at the worker, in an embodiment, this may enable scalability of system 100 and/or computing device.

With continued reference to FIG. 1, server 104 may be designed and/or configured to perform any method, method step, or sequence of method steps in any embodiment described in this disclosure, in any order and with any degree of repetition. For instance, server 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Server 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 may include an electric vertical take-off and landing (eVTOL) aircraft 108. eVTOL aircraft 112 may include any eVTOL aircraft described in this disclosure, including with reference to FIG. 4 below. For example, eVTOL aircraft 108 may include at least an aircraft component, such as a pilot control. Aircraft component may include any aircraft component described in this disclosure, for example with reference to FIGS. 3-8 below. Likewise, pilot control may include any pilot control described in this disclosure, for example with reference to FIGS. 3-8 below. In some embodiments, a pilot control may facilitate semi-autonomous flight. For example, a pilot control may be configured to operated not only by a trained pilot but by any occupant of eVTOL aircraft 108. eVTOL aircraft 108 may include at least a battery 112. Battery 112 may include at least a battery module and/or a plurality of battery cells. Battery 112 may include any battery described in this disclosure, including with reference to FIGS. 3-8 below. Battery may be mechanically connected to an electric vertical take-off and landing (eVTOL) aircraft 112. eVTOL aircraft 108 may additionally include at least a sensor 116. Sensor 116 may include any sensor described in this disclosure, including with reference to FIGS. 3-8 below. Sensor 116 may be configured to measure battery data 120 associated with battery 112. As used in this disclosure, "battery data" is at least a piece of information representative of a characteristic of a battery 112. Battery data 120 may include information about battery state, usage, condition, and the like. Exemplary types of battery include battery charge, battery current, battery potential, battery temperature, battery cycle count, battery utilization, and the like. In some cases, battery data 120 may include a metric which is derived from other battery data 120. For example, in some cases, battery data 120 may include a battery degradation metric 124. As used in this disclosure, a "battery degradation metric" is a quantifiable value that represents a battery's degradation. In some cases, battery degradation metric 124 may represent battery degradation as a proportion relative an ideal and/or new condition. Alternatively or additionally, battery degradation metric 124 may represent battery's degradation according to predicted expiration or useable life remaining. Alternatively or additionally, battery degradation metric 124 may represent battery's degradation in absolute terms, for example without limitation the battery degradation metric may represent power storage capacity of battery 112, thereby indicating its degradation through representing its present capacity. In some embodiments, battery degradation metric 124 may be generated as a function of battery data 120, for instance using server 104. In some exemplary embodiments, server 104 may generate battery degradation metric 124 according to an exemplary process. In some cases, battery degradation metric 124 may include a measure of battery aging. Battery degradation metric 124 may be a function of battery charge, for instance without limitation battery degradation metric 124 may be a ratio of current battery charge over a maximum/new battery charge, which indicates a ratio or proportion of maximum charge which battery is presently operating at. In some cases, battery degradation metric 124 may be estimated using a throughput model, for example $$\text{Throughput} = N_{cycles} * DOD * \text{Capacity}$$

Where throughput may be in units of Amp-hours, $N_{cycles}$ is number of charge-discharge cycles for battery, DOD is a representative proportion of discharge, and capacity is battery capacity, for example in units of Amp-hours. DOD (Depth of Discharge) may be mean discharge during use, for example if battery during use on average is discharged from 90% to 10% then DOD would equal 0.8. The above equation may be used to estimate a total throughput of a battery. Throughput may then be compared to anticipated of specified expected life throughput in order to estimate a battery degradation metric. Batteries, such as lithium-cells, have a performance that decreases over time. Performance degradation occurs both when they are used (on cycling) and when they are in storage. Degradation due to aging may be caused mainly by a primary mechanism of a passive layer growing at a negative electrode, corresponding to a so-called solid-electrolyte interphase (SEI), therefore causing a loss of lithium ions cyclability, finally decreasing a total capacity of battery 108. Passive layer growth at negative electrode may be a primary cause for degradation resulting from ageing during active and inactive regimes (i.e., pure storage). Alternatively or additionally, batteries may degrade through presence of mechanical defects within a bulk material at a positive electrode. In some cases, these mechanical defects may be caused by repeated insertion and deinsertion of lithium ions inside structure. This process, in some cases, generally takes place during cycling of battery 108, therefore degradation according to mechanical defects at positive electrode may be considered primarily a result of use of battery 112, or battery 112 cycles and not temporal aging. In some cases, battery degradation may be estimated based upon one or more of impedance and/or internal resistance, which may be found by at least a sensor 116.

With continued reference to FIG. 1, server 104 may receive battery data 120 from sensor 116. In some embodiments, server 104 is communicatively connected to sensor 116, and/or eVTOL aircraft 108, by way of at least a network 128. Network 128 may include any network described in this disclosure, including for instance with reference to FIG. 2 below. As used in this disclosure, "communicative connection" refers to a capability of two or more devices to transmit and/or receive data from one another, for example by way of one or more signals. Communicative connection may be achieved by way of numerous mechanisms and/or mediums including without limitation optical signals, electrical signals, radio signals, digital signals, analog signals and the like. In some additional embodiments, communicative connection may be achieved by way of pneumatic, hydraulic, and/or mechanical signals. In some cases, network 128 may include a wireless network, such as Wi-Fi. Alternatively or additionally, in some cases network 128 may include a wired network, for example without limitation Ethernet.

With continued reference to FIG. 1, server 104 may receive mission data 132. As used in this disclosure, "mission data" is at least a piece of information representative about a characteristic of a planned flight mission. Exemplary non-limiting mission data 132 includes cargo, takeoff weight, pilot, historical flight patterns of pilot, aircraft configuration, flight operation, takeoff style, and the like. As used in this disclosure, a "planned flight mission" is flight mission that is being considered. A planned flight mission may include a flight that is planned to occur. A planned flight mission may include a flight that potentially or conditionally may occur. Additionally, a planned flight mission may include, in some embodiments, a flight mission that is only being hypothetically considered, for example without limitation as part of a training exercise. In some cases, server 104 may receive mission data 132 from another resource local to server 104 and/or eVTOL aircraft 108. Alternatively or additionally, in some cases, server 104 may receive mission data 132 from a remote device 136. As used in this disclosure, a "remote device" is a computing device that is remote from server 104. In some cases, a remote device 136 may be communicatively connected to server 104. A remote device may include any type of computing device including without limitation a computer, a smartphone, a tablet, a microprocessor, and the like. In some cases, remote device 136 may communicatively connected to server 104 by way of at least a network 128. In some cases, remote device 136 may include a flight controller for eVTOL aircraft 108.

With continued reference to FIG. 1, server 104 may generate a recharge time 140 as a function of one or more of battery data 112 and mission data 132. As used in this disclosure, a "recharge time" is an amount of time, estimated, predicted, or actual, that a battery will need to recharge to reach a capacity for a planned flight mission. In some embodiments, recharge time 140 may include a battery cool time 144 during which a battery cools before being used to power an aircraft component again. As used in this disclosure, a "battery cool time" is an amount of time, estimated, predicted, or actual, that must elapse before a battery 112 has cooled enough for use. Battery 112 use may include charging and/or recharging. Alternatively or additionally, battery 112 use may include battery 112 being used as a power source, for example without limitation to power at least an aircraft component. In some embodiments, server may generate battery cooling time 144 using a thermal model 148. As used in this disclosure, a "thermal model" is a representation of temperature or other thermal parameters, such as without limitation entropy, enthalpy, and extropy, as well as derivatives or rates of change of thermal parameters. In some cases, a thermal model may be used to predict heat transfer of a body, for instance without limitation predict cooling of a battery. Exemplary thermal models include thermal models employing finite element analysis. In some cases, a thermal model may use analytical modeling methods and make use of known thermodynamic and/or fluid dynamic laws, for example without limitation Newton's Law of Cooling, Fourier Conduction, and Kirchhoff's law of thermal radiation. In some cases, thermal model 148 may use thermal modeling software. Exemplary thermal modeling software includes without limitation COMSOL from COMSOL, Inc. of Burlington, Mass., U.S.A. In some cases, battery 112 may need to cool after charging before eVTOL 108 may fly again. In some cases, battery data 120 may be used by thermal model 148. For example, in some cases, a battery degradation metric 124, such as without limitation internal resistance/impedance of battery 112, may be used to predict thermal characteristics, such as without limitation temperature, of battery during a charge. Thermal model 148 may be used to predict a rate of cooling and determine a cooling time 144 needed after charging and before a planned flight mission. In some cases, server 104 determines charging parameters, such as without limitation a rate of charge and a charging time. Server 104 may optimize charging parameters and/or cooling time 144 to determine a shortest possible recharge time based upon battery data 120 and mission data 132. In some cases, at least a battery 112 must have a measured temperature below a certain threshold prior to takeoff.

With continued reference to FIG. 1, in an exemplary embodiment server 104 may generate recharge time 140 as a function of battery data 120 and mission data 132 according to an exemplary process. In some cases, server 104 may generate recharge time based in part upon historic mission data. For example, historical mission data may include data about flight component utilization and/or power consumption. In some cases, historical mission data may represent one or more characteristics of how eVTOL is likely to be flown during a planned flight mission, for instance power consumption during the planned flight mission. In some cases, mission data 132 may include information about expected duration and/or distance of planned flight mission. In some embodiments, server 104 may generate recharge time 140 as a function of battery degradation metric 124. In some embodiments, server 104 may generate recharge time according to a machine-learning process. Machine-learning process may include any machine-learning process described in this disclosure, including for example with reference to FIG. 8 below. For example, training data may be generated and/or received which correlates inputs, including without limitation mission data 132 and/or battery data 120, to outputs, including without limitation recharge time 140 and/or cooling time. In some cases, training data elements include historic data related to previous flight missions and/or battery states. In some cases, training data may be generated from modeled data, for example from a battery degradation model and/or a thermal model. In some cases, training data may be classified, for example by one or more classifiers, according to a classification. Classification may include individual eVTOL aircraft 108, aircraft type or model, mission classification, battery age or type, and the like.

Figure 2:
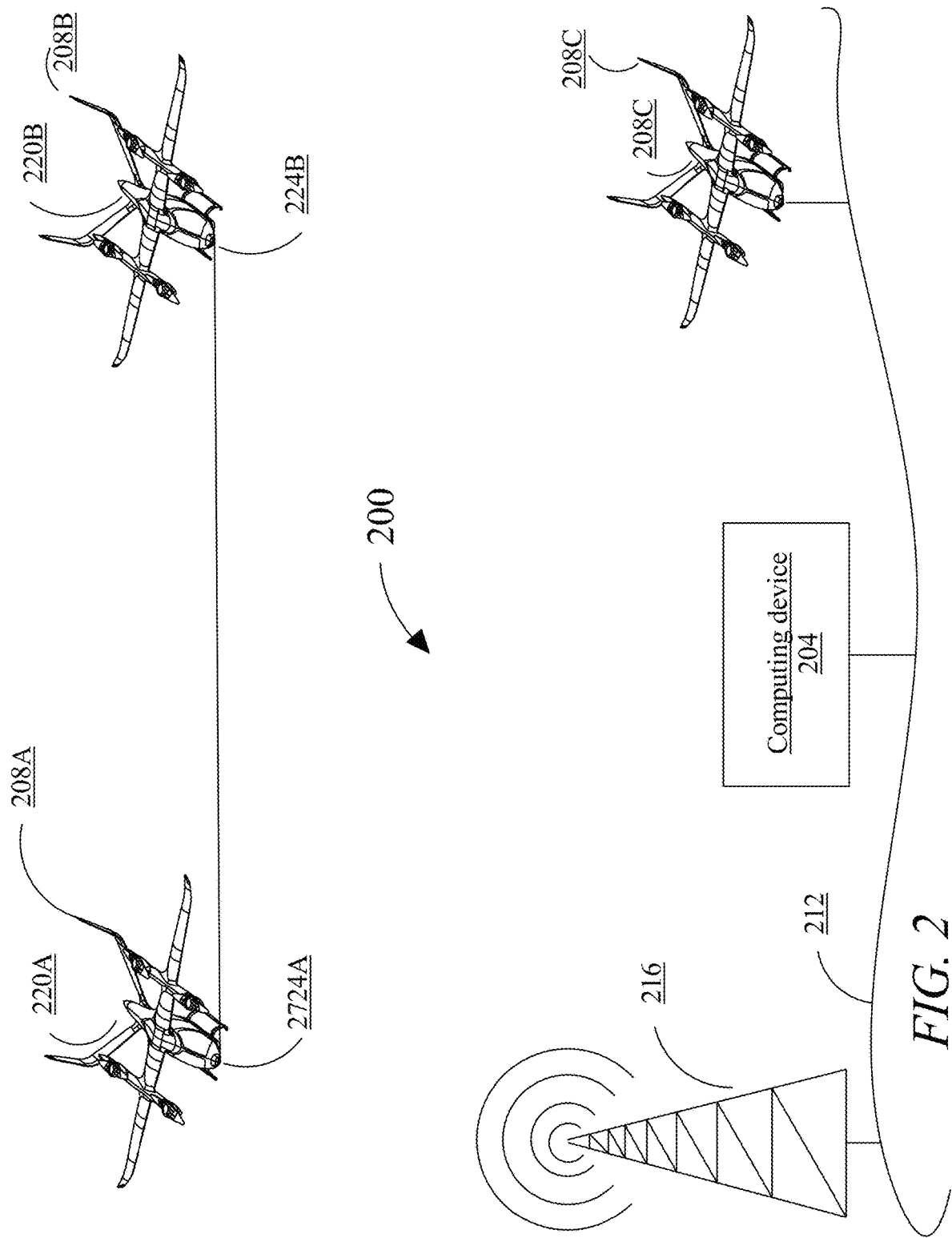
FIG. 2 is a block diagram of an exemplary avionic network.

Referring to FIG. 2, an avionic network 200 is schematically illustrated. According to some embodiments, an avionic network may include a single network. Alternatively or additionally, an avionic network may include more than a single network. A single networks may be differentiated according to address, for example Internet Protocol address, gateway, or name server used. For example, in some cases, multiple networks may use different gateways, even though the multiple networks may still be within communicative connection with one another.

With continued reference to FIG. 2, in some embodiments, an avionic network 200 may include inter-aircraft network nodes, intra-aircraft network nodes, as well as non-aircraft network nodes. As used in this disclosure, a "network node" is any component communicatively coupled to at least a network. For example, a network node may include an endpoint, for example a computing device on network, a switch, a router, a bridge, and the like. A network node may include a redistribution point, for example a switch, or an endpoint, for example a component communicatively connected to network. As used in this disclosure, "inter-aircraft network nodes" are two or more network nodes that are physically located in two or more aircraft and communicatively connected by way of an inter-aircraft network. As used in this disclosure, "intra-aircraft network nodes" are two or more intra-aircraft network nodes that are each physically located within a single aircraft and communicatively connected. As used in this disclosure, a "non-aircraft network node" is a network node that is not located on an aircraft and is communicatively connected to a network.

With continued reference to FIG. 2, in some embodiments, avionic network 200 may include a network organized in a topology. A topology may include a networked infrastructure in which network nodes may be connected directly, dynamically, and/or non-hierarchically to many other nodes (e.g., as many other nodes as possible). In some cases, a topology may facilitate cooperation between network nodes, for example redistributive network nodes, in routing of communication between network participants (e.g., other network nodes). A topology may facilitate a lack of dependency on any given node, thereby allowing other nodes to participate in relaying communication. In some cases, networks may dynamically self-organize and self-configure. Self-configuration enables dynamic distribution of workloads, particularly in event a network node failure, thereby contributing to fault-tolerance and reduced maintenance requirements. In some embodiments, networks can relay messages using either a flooding technique or a routing technique. A flooding technique sends a message to every network node, flooding network with the message. A routing technique allows a network to communicate a message is propagated along a determined nodal path to the message's intended destination. Message routing may be performed by networks in part by ensuring that all nodal paths are available. Nodal path availability may be ensured by maintaining continuous nodal network connections and reconfiguring nodal paths with an occurrence of broken nodal paths. Reconfiguration of nodal paths, in some cases, may be performed by utilizing self-healing algorithms, such as without limitation Shortest Path Bridging. Self-healing allows a routing-based network to operate when a node fails or when a connection becomes unreliable. In some embodiments, a network having all network nodes connected to each other may be termed a fully connected network. Fully connected wired networks have advantages of security and reliability. For example, an unreliable wired connection between two wired network nodes will only affect only two nodes attached to the unreliable wired connection.

With continued reference to FIG. 2, an exemplary avionic network 200 is shown providing communicative connection between a computing device 204 and aircraft 208A-C. Computing device 204 may include any computing device described in this disclosure. In some embodiments, computing device 204 may be connected to a terrestrial network 212. Terrestrial networks 212 may include any network described in this disclosure and may include, without limitation, wireless networks, local area networks (LANs), wide area networks (WANs), ethernet, Internet, mobile broadband, fiber optic communication, and the like. In some cases, a grounded aircraft 208C may be connected to an avionic network 200 by way of a terrestrial network 212. In some cases, avionic network 200 may include a wireless communication node 216. A wireless communication node 216 may provide communicative connection by way of wireless networking. Wireless networking may include any wireless network method described in this disclosure, including without limitation Wi-Fi, mobile broadband, optical communication, radio communication, and the like. In some cases, wireless communication node 216 may be configured to connect with a first airborne aircraft in flight 208A. First airborne aircraft in some embodiments may include at least a first intra-aircraft network node 220A. As described above, first intra-aircraft network node 220A may be configured to connect to other nodes within first airborne aircraft 208A. In some cases, avionic network 200 may be configured to provide inter-aircraft communication, for instance by using a first inter-aircraft network node 224A. In some cases, first inter-aircraft network node may be configured to communicate with a second inter-aircraft network node 224B. Inter-aircraft nodes 220A-B may include radio communication and/or optical wireless communication, for example free space optical communication.

With continued reference to FIG. 2, avionic network 200 may be additionally configured to provide for encrypted and/or secured communication between components, i.e., nodes, communicative on the network. In some cases, encrypted communication on network 200 may be provided for by way of end-to-end encryption. Exemplary non-limited end-to-end encryption methods include symmetric key encryption, asymmetric key encryption, public key encryption methods, private key encryption methods and the like. In some cases, avionic network 200 and/or another network may be configured to provide secure key exchange for encryption methods. Exemplary non-limiting key exchange methods include Diffie-Hellman key exchange, Supersingular isogeny key exchange, use of at least a trusted key authority, password authenticated key agreement, forward secrecy, quantum key exchange, and the like. In some cases, an avionic network 200 may include at least an optical network component, for example fiber optic cables, wireless optical networks, and/or free space optical network. In some cases, encrypted communication between network nodes may be implemented by way of optical network components. For example, quantum key exchange in some embodiments, may defeat man-in-the-middle attacks. This is generally because, observation of a quantum system disturbs the quantum system. Quantum key exchange in some cases, uses this general characteristic of quantum physics to communicate sensitive information, such as an encryption key, by encoding the sensitive information in polarization state of quantum of radiation. At least a polarization sensitive detector may be used to decode sensitive information.

Figure 3:
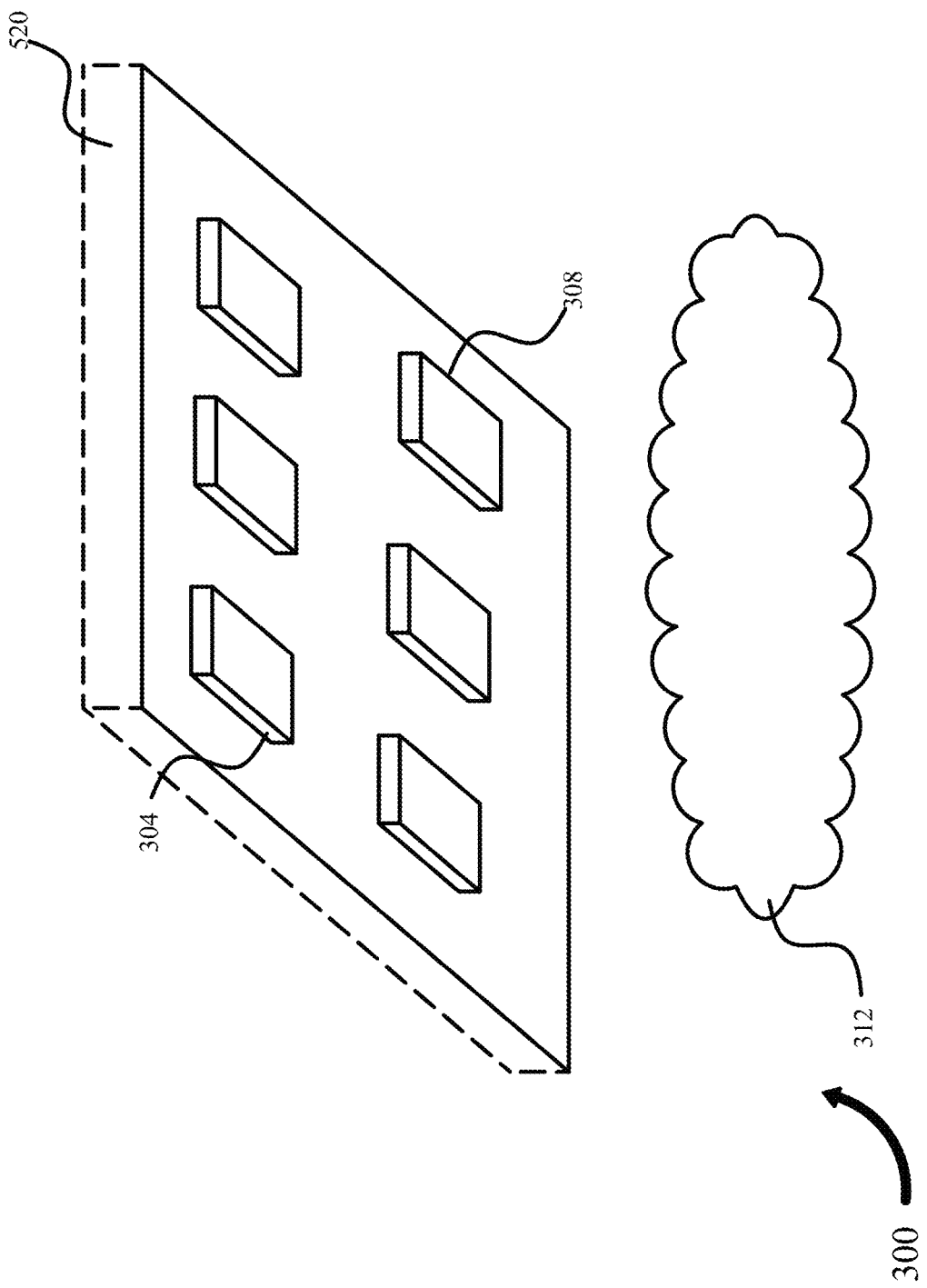
FIG. 3 is a block diagram depicting an exemplary battery sensor suite.

Referring now to FIG. 3, an embodiment of sensor suite 300 is presented. The herein disclosed system and method may comprise at least a sensor 116 in the form of one or more individual sensors or a sensor suite 300 working in tandem or individually. A sensor suite 300 may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit communicatively connected to server. In a non-limiting example, there may be four independent sensors housed in and/or on battery measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of system 100 to calculate battery degradation and/or predict a recharge time is maintained.

Sensor suite 300 may be suitable for use as at least a sensor 116 as disclosed with reference to FIG. 1 above. Sensor suite 300, in some cases, may include a humidity sensor 304. "Humidity," as used in this disclosure, is a property of a gaseous medium, for example without limitation air, to hold water in, for example in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present state of absolute humidity relative to a maximum humidity given the same temperature. "Specific humidity", for the purposes of this disclosure, is the ratio of water vapor mass to total moist air parcel mass, where parcel is a given portion of a gaseous medium. Humidity sensor 304 may be psychrometer. Humidity sensor 304 may be a hygrometer. Humidity sensor 304 may be configured to act as or include a humidistat. A "humidistat", for the purposes of this disclosure, is a humidity-triggered switch, often used to control another electronic device. Humidity sensor 304 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 3, sensor suite 300 may include multimeter 308. Multimeter 308 may be configured to measure potential (i.e., voltage) across a component, electrical current through a component, and resistance of a component. Multimeter 308 may include separate sensors to measure each of the previously disclosed electrical characteristics such as voltmeter, ammeter, and ohmmeter, respectively. Alternatively or additionally, and with continued reference to FIG. 3, sensor suite 300 include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 300 and/or a control circuit incorporated therein and/or communicatively connected thereto may be configured to adjust charge to one or more battery cells as a function of a charge level and/or a detected parameter. For instance, and without limitation, sensor suite 300 may be configured to determine that a charge level of a battery cell is high based on a detected voltage level of that battery cell or portion of the battery pack. Sensor suite 300 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, for example will overheat, or the like. Detection of a charge reduction event may include detection of a temperature, of the cell above a threshold level, detection of a voltage and/or resistance level above or below a threshold, or the like. Sensor suite 300 may include digital sensors, analog sensors, or a combination thereof. Sensor suite 300 may include digital-to-analog converters (DAC), analog-to-digital converters (ADC, A/D, A-to-D), a combination thereof, or other signal conditioning components.

With continued reference to FIG. 3, sensor suite 300 may include a temperature sensor, such as without limitation thermocouples, thermistors, thermometers, passive infrared sensors, resistance temperature sensors (RTD's), semiconductor based integrated circuits (IC), a combination thereof or another undisclosed sensor type, alone or in combination. "Temperature," for the purposes of this disclosure, is a measure of the heat energy of a system. Temperature, as measured by any number or combinations of sensors present within sensor suite 300, may be measured in Fahrenheit (°

F.), Celsius (° C.), Kelvin (° K), or another scale alone or in combination. The temperature measured by sensors may comprise electrical signals which are transmitted to their appropriate destination wireless or through a wired connection.

With continued reference to FIG. 3, sensor suite 300 may include a sensor configured to detect gas that may be emitted during or after a catastrophic cell failure. "Catastrophic cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of catastrophic cell failure 312 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 300, may be configured to detect combustible, flammable, toxic, oxygen depleted, a combination thereof, or another type of gas alone or in combination. The gas sensor that may be present in sensor suite 300 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 300 may include sensors that are configured to detect non-gaseous byproducts of catastrophic cell failure 312 including, in non-limiting examples, liquid chemical leaks including aqueous alkaline solution, ionomer, molten phosphoric acid, liquid electrolytes with redox shuttle and ionomer, and salt water, among others. Sensor suite 300 may include sensors that are configured to detect non-gaseous byproducts of catastrophic cell failure 312 including, in non-limiting examples, electrical anomalies as detected by any of the previous disclosed sensors or components.

With continued reference to FIG. 3, sensor suite 300 may be configured to detect events where voltage nears an upper voltage threshold or lower voltage threshold. The upper voltage threshold may be stored in data storage system 120 for comparison with an instant measurement taken by any combination of sensors present within sensor suite 300. The upper voltage threshold may be calculated and calibrated based on factors relating to battery cell health, maintenance history, location within battery pack, designed application, and type, among others. Sensor suite 300 may measure voltage at an instant, over a period of time, or periodically. Sensor suite 300 may be configured to operate at any of these detection modes, switch between modes, or simultaneous measure in more than one mode. First battery management component 104 may detect through sensor suite 300 events where voltage nears the lower voltage threshold. The lower voltage threshold may indicate power loss to or from an individual battery cell or portion of the battery pack. First battery management component 104 may detect through sensor suite 300 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

Figure 4:
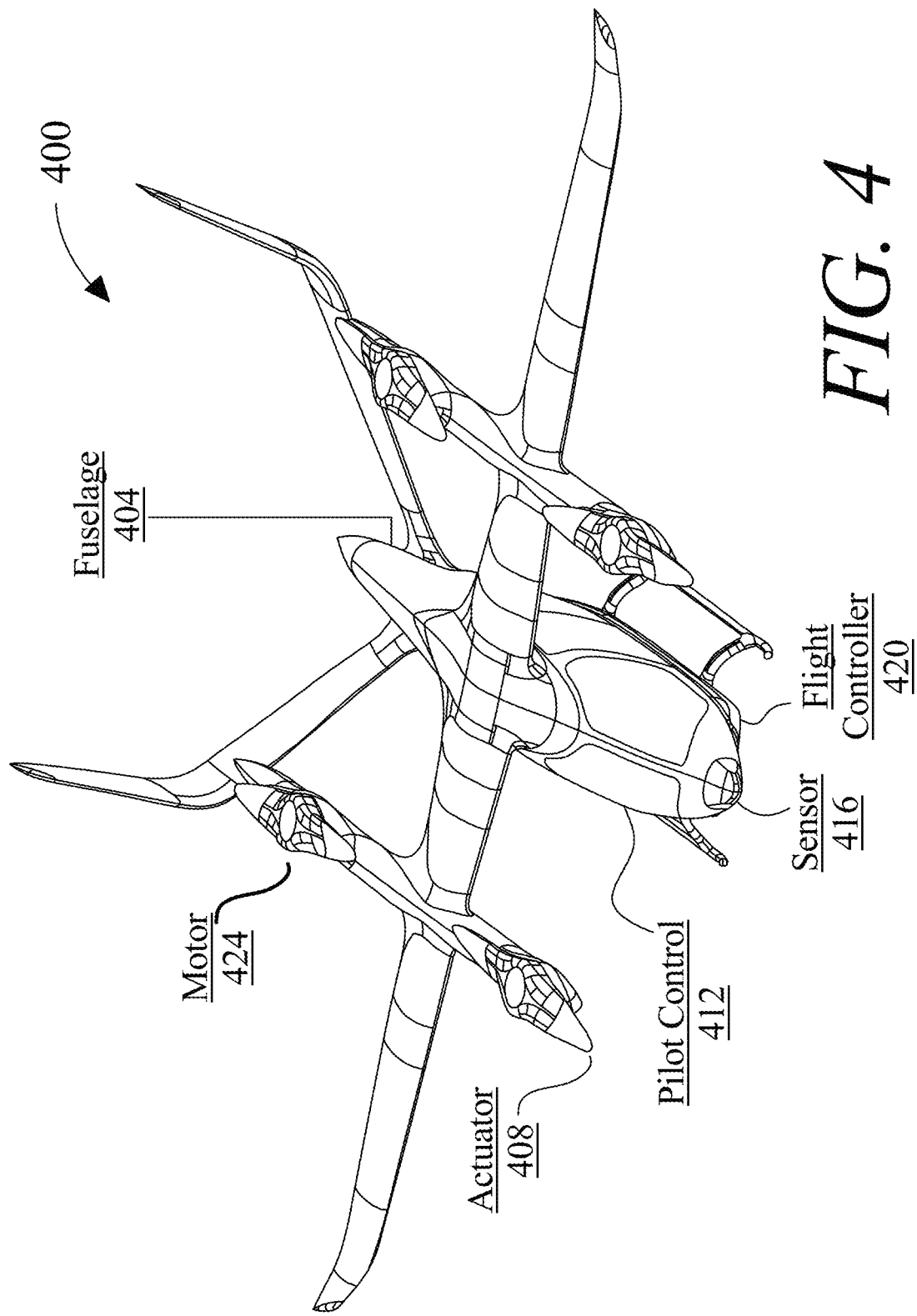
FIG. 4 is a schematic representation of an exemplary electric vertical take-off and landing aircraft.

Referring now to FIG. 4, an exemplary embodiment of an aircraft 400 is illustrated. Aircraft 400 may include an electrically powered aircraft. In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 4, aircraft 400 may include a fuselage 404. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 404 may comprise structural elements that physically support the shape and structure of an aircraft. Structural elements may take a plurality of forms, alone or in combination with other types. Structural elements may vary depending on the construction type of aircraft and specifically, the fuselage. Fuselage 404 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 4, aircraft 400 may include a plurality of actuators 408. Actuator 408 may include any actuator described in this disclosure, for instance in reference to FIGS. 1-3. In an embodiment, actuator 408 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 4, a plurality of actuators 408 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 408 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 408 may include a rudder, which may include, without limitation, a segmented rudder that produces a torque about a vertical axis. Additionally or alternatively, plurality of actuators 408 may include other flight control surfaces such as propulsors, rotating flight controls, or any other structural features which can adjust movement of aircraft 400. Plurality of actuators 408 may include one or more rotors, turbines, ducted fans, paddle wheels, and/or other components configured to propel a vehicle through a fluid medium including, but not limited to air.

Still referring to FIG. 4, plurality of actuators 408 may include at least a propulsor component. As used in this disclosure a "propulsor component" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 4, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 4, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 4, plurality of actuators 408 may include power sources, control links to one or more elements, fuses, and/or mechanical couplings used to drive and/or control any other flight component. Plurality of actuators 408 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

Still referring to FIG. 4, plurality of actuators 408 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

In an embodiment, and still referring to FIG. 4, an energy source may be used to provide a steady supply of electrical power to a load over a flight by an electric aircraft 400. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 4, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/848,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 4, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 4, another exemplary actuator may include landing gear. Landing gear may be used for take-off and/or landing/Landing gear may be used to contact ground while aircraft 400 is not in flight. Exemplary landing gear is disclosed in detail in U.S. patent application Ser. No. 17/196,619 entitled "SYSTEM FOR ROLLING LANDING GEAR" by R. Griffin et al., which is incorporated in its entirety herein by reference.

Still referring to FIG. 4, aircraft 400 may include a pilot control 412, including without limitation, a hover control, a thrust control, an inceptor stick, a cyclic, and/or a collective control. As used in this disclosure a "collective control" is a mechanical control of an aircraft that allows a pilot to adjust and/or control the pitch angle of the plurality of actuators 408. For example and without limitation, collective control may alter and/or adjust the pitch angle of all of the main rotor blades collectively. For example, and without limitation pilot control 412 may include a yoke control. As used in this disclosure a "yoke control" is a mechanical control of an aircraft to control the pitch and/or roll. For example and without limitation, yoke control may alter and/or adjust the roll angle of aircraft 400 as a function of controlling and/or maneuvering ailerons. In an embodiment, pilot control 412 may include one or more foot-brakes, control sticks, pedals, throttle levels, and the like thereof. In another embodiment, and without limitation, pilot control 412 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 400 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 400 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 4, pilot control 412 may be configured to modify a variable pitch angle. For example, and without limitation, pilot control 412 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 412 may modify the variable pitch angle from a first angle of 2.61° to a second angle of 3.72°. Additionally or alternatively, pilot control 412 may be configured to translate a pilot desired torque for flight component 108. For example, and without limitation, pilot control 412 may translate that a pilot's desired torque for a propeller be 150 lb. ft. of torque. As a further non-limiting example, pilot control 412 may introduce a pilot's desired torque for a propulsor to be 280 lb. ft. of torque. Additional disclosure related to pilot control 412 may be found in U.S. patent application Ser. Nos. 17/001,845 and 16/829,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 4, aircraft 400 may include a loading system. A loading system may include a system configured to load an aircraft of either cargo or personnel. For instance, some exemplary loading systems may include a swing nose, which is configured to swing the nose of aircraft 400 of the way thereby allowing direct access to a cargo bay located behind the nose. A notable exemplary swing nose aircraft is Boeing 747. Additional disclosure related to loading systems can be found in U.S. patent application Ser. No. 17/137,584 entitled "SYSTEM AND METHOD FOR LOADING AND SECURING PAYLOAD IN AN AIRCRAFT" by R. Griffin et al., entirety of which in incorporated herein by reference.

Still referring to FIG. 4, aircraft 400 may include a sensor 416. Sensor 416 may include any sensor described in this disclosure, for instance in reference to FIGS. 1-3. Sensor 416 may be configured to sense a characteristic of pilot control 412. Sensor may be a device, module, and/or subsystem, utilizing any hardware, software, and/or any combination thereof to sense a characteristic and/or changes thereof, in an instant environment, for instance without limitation a pilot control 412, which the sensor is proximal to or otherwise in a sensed communication with, and transmit information associated with the characteristic, for instance without limitation digitized data. Sensor 416 may be mechanically and/or communicatively coupled to aircraft 400, including, for instance, to at least a pilot control 412. Sensor 416 may be configured to sense a characteristic associated with at least a pilot control 412. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 416 may include at least a geospatial sensor. Sensor 416 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 400 for both critical and non-critical functions. Sensor may be incorporated into vehicle or aircraft or be remote.

Still referring to FIG. 4, in some embodiments, sensor 416 may be configured to sense a characteristic associated with any pilot control described in this disclosure. Non-limiting examples of a sensor 416 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 416 may sense a characteristic as an analog measurement, for instance, yielding a continuously variable electrical potential indicative of the sensed characteristic. In these cases, sensor 416 may additionally comprise an analog to digital converter (ADC) as well as any additionally circuitry, such as without limitation a Whetstone bridge, an amplifier, a filter, and the like. For instance, in some cases, sensor 416 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 400, for instance without limitation a computing system, a pilot display, and a memory component. Alternatively or additionally, sensor 416 may sense a characteristic of a pilot control 412 digitally. For instance in some embodiments, sensor 416 may sense a characteristic through a digital means or digitize a sensed signal natively. In some cases, for example, sensor 416 may include a rotational encoder and be configured to sense a rotational position of a pilot control; in this case, the rotational encoder digitally may sense rotational "clicks" by any known method, such as without limitation magnetically, optically, and the like.

Still referring to FIG. 4, electric aircraft 400 may include at least a motor 424, which may be mounted on a structural feature of the aircraft. Design of motor 424 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 424 may include two main holes in top and bottom of mounting area to access bearing cartridge. Further, a structural feature may include a component of electric aircraft 400. For example, and without limitation structural feature may be any portion of a vehicle incorporating motor 424, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 408. Persons skilled in the art, upon reviewing the entirety of this disclosure, will be aware of various materials, combinations of materials, and/or constructions techniques.

Still referring to FIG. 4, electric aircraft 400 may include a vertical takeoff and landing aircraft (eVTOL). As used herein, a "vertical take-off and landing (eVTOL) aircraft" is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight. In some embodiments, an eVTOL aircraft 400 includes at least an aircraft component. As used in this disclosure, an "aircraft component" is any part of an aircraft, for example without limitation pilot controls, sensors, flight components, propulsors, landing gear, and the like.

With continued reference to FIG. 4, a number of aerodynamic forces may act upon the electric aircraft 400 during flight. Forces acting on electric aircraft 400 during flight may include, without limitation, thrust, the forward force produced by the rotating element of the electric aircraft 400 and acts parallel to the longitudinal axis. Another force acting upon electric aircraft 400 may be, without limitation, drag, which may be defined as a rearward retarding force which is caused by disruption of airflow by any protruding surface of the electric aircraft 400 such as, without limitation, the wing, rotor, and fuselage. Drag may oppose thrust and acts rearward parallel to the relative wind. A further force acting upon electric aircraft 400 may include, without limitation, weight, which may include a combined load of the electric aircraft 400 itself, crew, baggage, and/or fuel. Weight may pull electric aircraft 400 downward due to the force of gravity. An additional force acting on electric aircraft 400 may include, without limitation, lift, which may act to oppose the downward force of weight and may be produced by the dynamic effect of air acting on the airfoil and/or downward thrust from the propulsor 408 of the electric aircraft. Lift generated by the airfoil may depend on speed of airflow, density of air, total area of an airfoil and/or segment thereof, and/or an angle of attack between air and the airfoil. For example, and without limitation, electric aircraft 400 are designed to be as lightweight as possible. Reducing the weight of the aircraft and designing to reduce the number of components is essential to optimize the weight. To save energy, it may be useful to reduce weight of components of electric aircraft 400, including without limitation propulsors and/or propulsion assemblies. In an embodiment, motor 424 may eliminate need for many external structural features that otherwise might be needed to join one component to another component. Motor 424 may also increase energy efficiency by enabling a lower physical propulsor profile, reducing drag and/or wind resistance. This may also increase durability by lessening the extent to which drag and/or wind resistance add to forces acting on electric aircraft 400 and/or propulsors.

Figure 5:
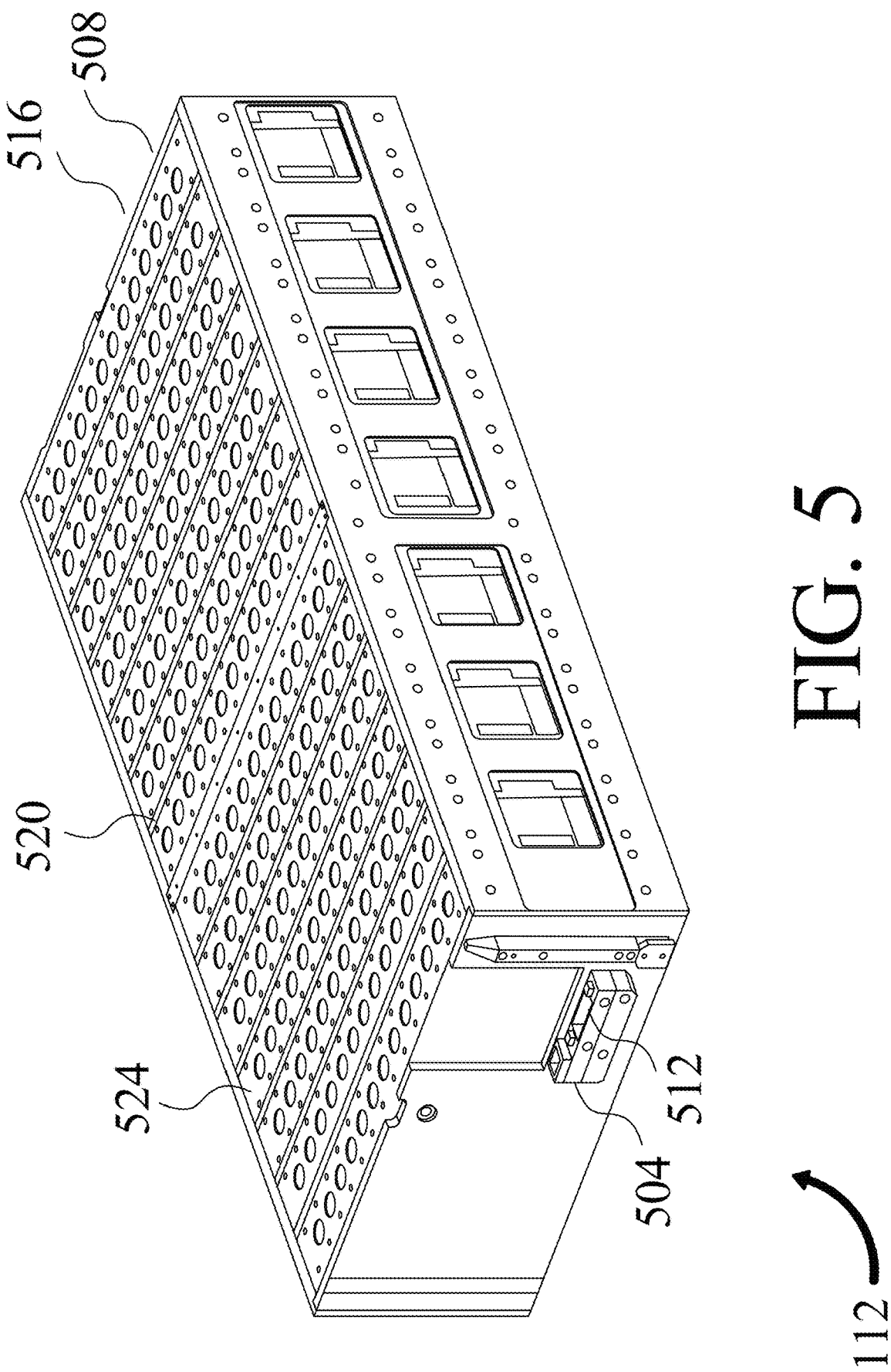
FIG. 5 is a schematic illustration of an exemplary battery pack.

With reference to FIG. 5, an exemplary embodiment of an eVTOL aircraft battery pack is illustrated. Battery 116, disclosed in reference to FIG. 1 above, in some embodiments, may include a battery pack 500. Battery pack 500 is a power source that is configured to store electrical energy in the form of a plurality of battery modules, which themselves include of a plurality of electrochemical cells also referred to herein as battery cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term "battery" is used as a collection of cells connected in series or parallel to each other. A battery cell may, when used in conjunction with other cells, may be electrically connected in series, in parallel or a combination of series and parallel. Series connection includes wiring a first terminal of a first cell to a second terminal of a second cell and further configured to include a single conductive path for electricity to flow while maintaining the same current (measured in Amperes) through any component in the circuit. A battery cell may use the term 'wired', but one of ordinary skill in the art would appreciate that this term is synonymous with 'electrically connected', and that there are many ways to couple electrical elements like battery cells together. An example of a connector that does not include wires may be prefabricated terminals of a first gender that mate with a second terminal with a second gender. Battery cells may be wired in parallel. Parallel connection includes wiring a first and second terminal of a first battery cell to a first and second terminal of a second battery cell and further configured to include more than one conductive path for electricity to flow while maintaining the same potential (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, battery pack 500 include 196 battery cells in series and 18 battery cells in parallel. This is, as someone of ordinary skill in the art would appreciate, is only an example and battery pack 500 may be configured to have a near limitless arrangement of battery cell configurations.

With continued reference to FIG. 5, battery pack 500 includes a plurality of battery modules. The battery modules may be wired together in series and in parallel. Battery pack 500 may include a center sheet which may include a thin barrier. Barrier may include a fuse connecting battery modules on either side of the center sheet. Fuse may be disposed in or on center sheet and configured to connect to an electric circuit comprising a first battery module and another battery unit and cells. In general, and for the purposes of this disclosure, a "fuse" is an electrical safety device that operate to provide overcurrent protection of an electrical circuit. As a sacrificial device, a fuse's essential component is metal wire or strip that melts when too much current flows through it, thereby interrupting energy flow. Fuse may include a thermal fuse, mechanical fuse, blade fuse, expulsion fuse, spark gap surge arrestor, varistor, or a combination thereof.

Battery pack 500 may also include a side wall which may include a laminate of a plurality of layers configured to thermally insulate plurality of battery modules from external components of battery pack 500. Side wall layers may include materials which possess characteristics suitable for thermal insulation as described in the entirety of this disclosure like fiberglass, air, iron fibers, polystyrene foam, and thin plastic films, to name a few. Side wall may additionally or alternatively electrically insulate plurality of battery modules from external components of battery pack 500 and layers of which may include polyvinyl chloride (PVC), glass, asbestos, rigid laminate, varnish, resin, paper, Teflon, rubber, and mechanical lamina. Center sheet may be mechanically coupled to side wall in any manner described in the entirety of this disclosure or otherwise undisclosed methods, alone or in combination. Side wall may include a feature for alignment and coupling to center sheet. This feature may include a cutout, slots, holes, bosses, ridges, channels, and/or other undisclosed mechanical features, alone or in combination.

With continued reference to battery pack 500 may also include an end panel including a plurality of electrical connectors and further configured to fix battery pack 500 in alignment with at least side wall. End panel may include a plurality of electrical connectors of a first gender configured to electrically and mechanically couple to electrical connectors of a second gender. End panel may be configured to convey electrical energy from battery cells to at least a portion of an eVTOL aircraft. Electrical energy may be configured to power at least a portion of an eVTOL aircraft or include signals to notify aircraft computers, personnel, users, pilots, and any others of information regarding battery health, emergencies, and/or electrical characteristics. Plurality of electrical connectors may include blind mate connectors, plug and socket connectors, screw terminals, ring and spade connectors, blade connectors, and/or an undisclosed type alone or in combination. Electrical connectors of which end panel includes may be configured for power and communication purposes. A first end of end panel may be configured to mechanically couple to a first end of a first side wall by a snap attachment mechanism, similar to end cap and side panel configuration utilized in battery module. To reiterate, a protrusion disposed in or on the end panel may be captured, at least in part, by a receptacle disposed in or on the side wall. A second end of end panel may be mechanically coupled to a second end of a second side wall in a similar or the same mechanism.

With continued reference to FIG. 5, at least a sensor 116 may be disposed in or on a portion of battery pack 500 near battery modules or battery cells. A first sensor suite 300 may be disposed in or on a first portion of battery pack 500 and second sensor suite 300 may be disposed in or on a second portion of battery pack 500. Battery pack 500 includes first high voltage front end 504 disposed on a first end of battery pack 500. First high voltage front end 504 is configured to communicate with a flight controller using a controller area network (CAN). Controller area network includes bus 512. Bus 512 may include an electrical bus. "Bus", for the purposes of this disclosure and in electrical parlance is any common connection to which any number of loads, which may be connected in parallel, and share a relatively similar voltage may be electrically coupled. Bus may refer to power busses, audio busses, video busses, computing address busses, and/or data busses. Bus 512 may be responsible for conveying electrical energy stored in battery pack 500 to at least a portion of an electric aircraft. Bus 512 may be additionally or alternatively responsible for conveying electrical signals generated by any number of components within battery pack 500 to any destination on or offboard an electric aircraft. First high voltage front end 504 may comprise wiring or conductive surfaces only in portions required to electrically couple bus 512 to electrical power or necessary circuits to convey that power or signals to their destinations. Outputs from sensors or any other components present within system may be analog or digital. Onboard or remotely located processors can convert those output signals from sensor suite 300 to a usable form by a destination of those signals. Usable form of output signals from sensors, through processor may be either digital, analog, a combination thereof or an otherwise unstated form. Processing may be configured to trim, offset, or otherwise compensate outputs of sensor suite 300. Based on sensor output, processor can determine output to send to downstream component. Processor can include signal amplification, operational amplifier (OpAmp), filter, digital/analog conversion, linearization circuit, current-voltage change circuits, resistance change circuits such as Wheatstone Bridge, an error compensator circuit, a combination thereof or otherwise undisclosed components.

With continued reference to FIG. 5, battery pack 500 includes second high voltage front end 508 disposed on a second end of battery pack 500. Second high voltage front end 508 may be configured to communicate with a flight controller by utilizing a controller area network (CAN). Second high voltage front end 5 includes second bus 516. Second bus 516 may include power busses, audio busses, video busses, computing address busses, and/or data busses. Bus 512 may be responsible for conveying electrical energy stored in battery pack 500 to at least a portion of an electric aircraft. Bus 512 may be additionally or alternatively responsible for conveying electrical signals generated by any number of components within battery pack 500 to any destination on or offboard an electric aircraft. Second high voltage front end 508 may comprise wiring or conductive surfaces only in portions required to electrically couple bus 512 to electrical power or necessary circuits to convey that power or signals to their destinations.

With continued reference to FIG. 5, any of the disclosed components or systems, namely battery pack 500, battery module sense board 520, and/or battery cells may incorporate provisions to dissipate heat energy present due to electrical resistance in integral circuit. Battery pack 500 includes one or more battery element modules wired in series and/or parallel. The presence of a voltage difference and associated amperage inevitably will increase heat energy present in and around battery pack 500 as a whole. The presence of heat energy in a power system is potentially dangerous by introducing energy possibly sufficient to damage mechanical, electrical, and/or other systems present in at least a portion of exemplary aircraft 400. Battery pack 500 may include mechanical design elements, one of ordinary skill in the art, may thermodynamically dissipate heat energy away from battery pack 500. The mechanical design may include, but is not limited to, slots, fins, heat sinks, perforations, a combination thereof, or another undisclosed element. Heat dissipation may include material selection beneficial to move heat energy in a suitable manner for operation of battery pack 500. Certain materials with specific atomic structures and therefore specific elemental or alloyed properties and characteristics may be selected in construction of battery pack 500 to transfer heat energy out of a vulnerable location or selected to withstand certain levels of heat energy output that may potentially damage an otherwise unprotected component. One of ordinary skill in the art, after reading the entirety of this disclosure would understand that material selection may include titanium, steel alloys, nickel, copper, nickel-copper alloys such as Monel, tantalum and tantalum alloys, tungsten and tungsten alloys such as Inconel, a combination thereof, or another undisclosed material or combination thereof. Heat dissipation may include a combination of mechanical design and material selection. The responsibility of heat dissipation may fall upon the material selection and design as disclosed above in regard to any component disclosed in this paper. The battery pack 500 may include similar or identical features and materials ascribed to battery pack 500 in order to manage the heat energy produced by these systems and components. According to embodiments, the circuitry disposed within or on battery pack 500 may be shielded from electromagnetic interference. Battery elements and associated circuitry may be shielded by material such as mylar, aluminum, copper a combination thereof, or another suitable material. Battery pack 500 and associated circuitry may include one or more of the aforementioned materials in their inherent construction or additionally added after manufacture for the express purpose of shielding a vulnerable component. Battery pack 500 and associated circuitry may alternatively or additionally be shielded by location. Electrochemical interference shielding by location includes a design configured to separate a potentially vulnerable component from energy that may compromise the function of said component. The location of vulnerable component may be a physical uninterrupted distance away from an interfering energy source, or location configured to include a shielding element between energy source and target component. Shielding may include an aforementioned material in this section, a mechanical design configured to dissipate the interfering energy, and/or a combination thereof. Shielding comprising material, location and additional shielding elements may defend a vulnerable component from one or more types of energy at a single time and instance or include separate shielding for individual potentially interfering energies.

Still referring to FIG. 5, battery module sense board 520 may include a first opposite and opposing flat surface and may be configured to cover a portion of battery module within battery pack and face directly to at least an end of electrochemical battery cells. Battery module sense board 520 may be consistent with the sense board disclosed in U.S. patent application Ser. No. 16/948,140 entitled, "System and Method for High Energy Density Battery Module" and incorporated herein by reference in its entirety. At least a first sensor 116 may, in some embodiments be disposed on a first side of battery module sense board 520 and at least a second sensor 116 may be disposed on a second side of battery module sense board 520. Alternatively, at least a first sensor 116 may be disposed on a first end of battery module sense board 520 and at least a second sensor 116 second battery management component 108 may be disposed on a second end of battery module sense board 520.

Figure 6:
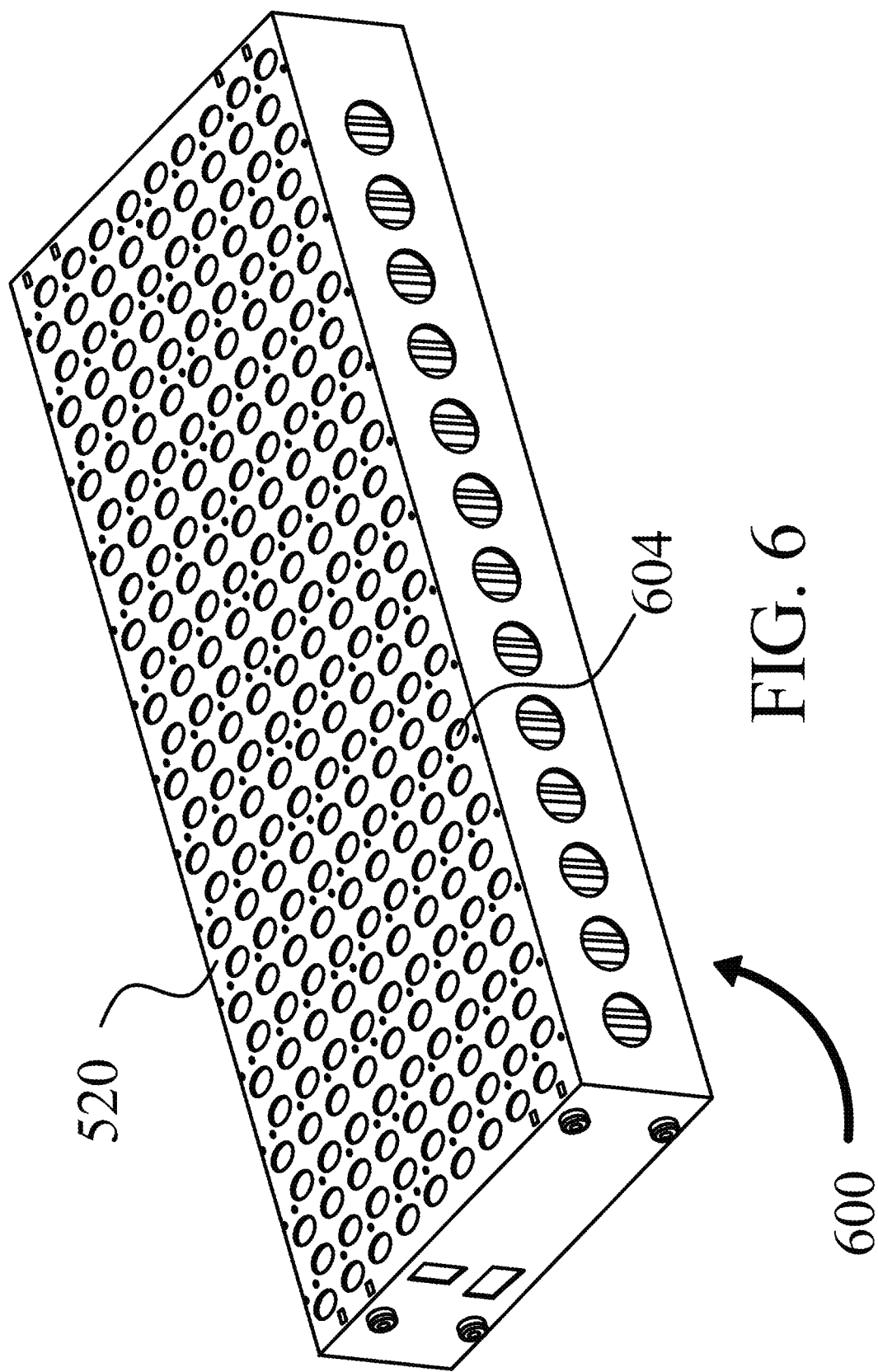
FIG. 6 is a schematic representation of an exemplary battery module.

With reference to FIG. 6, battery module 600 is presented including battery module sense board 520 shown opening aligned with the battery cells 604. Battery module sense board 520 may monitor battery cells 604. Battery module sense board 520 may include a rectangular prism shape configured to be opposite and oppose a back plate with openings correlating to battery cells 604. Battery module sense board 520 may include one or more circuits and/or circuit elements, including without limitation a printed circuit board component, aligned with a first side of battery module 600 and the openings correlating to the battery cells 604. Battery module sense board 520 may include, without limitation, a control circuit configured to perform and/or direct any actions performed by battery module sense board 520 and/or any other component and/or element described in this disclosure; control circuit may include any analog or digital control circuit, including without limitation a combinational and/or synchronous logic circuit, a processor, microprocessor, microcontroller, or the like.

Still referring to FIG. 6, battery module sense board 520 may include at least a sensor 116 or sensor suite 300 configured to measure physical and/or electrical parameters, such as without limitation temperature and/or voltage, of one or more battery cells. Battery module sense board 520 may be configured to aggregate battery data 120 from a plurality of sensors 116 and sensor suites 300. In some cases, battery module sense board 520 may perform signal analysis on one or more signals from at least a sensor 116 and/or sensor suite 300. Battery module sense board 520 and/or a control circuit incorporated therein and/or communicatively connected thereto, may further be configured to detect failure within each battery cell 604, for instance and without limitation as a function of and/or using detected physical and/or electrical parameters. Cell failure may be characterized by a spike in temperature and battery module sense board 520 may be configured to detect that increase and generate signals, to notify users, support personnel, safety personnel, maintainers, operators, emergency personnel, aircraft computers, or a combination thereof and stored in data storage system. In some embodiments, battery module sense board 520 may be communicatively connected to server 104, for example without limitation by way of at least a network 128. In some cases, battery module sense board 520 may be configured to generate a battery degradation metric 124 and communicate at least one of battery degradation metric 124 and battery data 120 to server 104.

Figure 7:
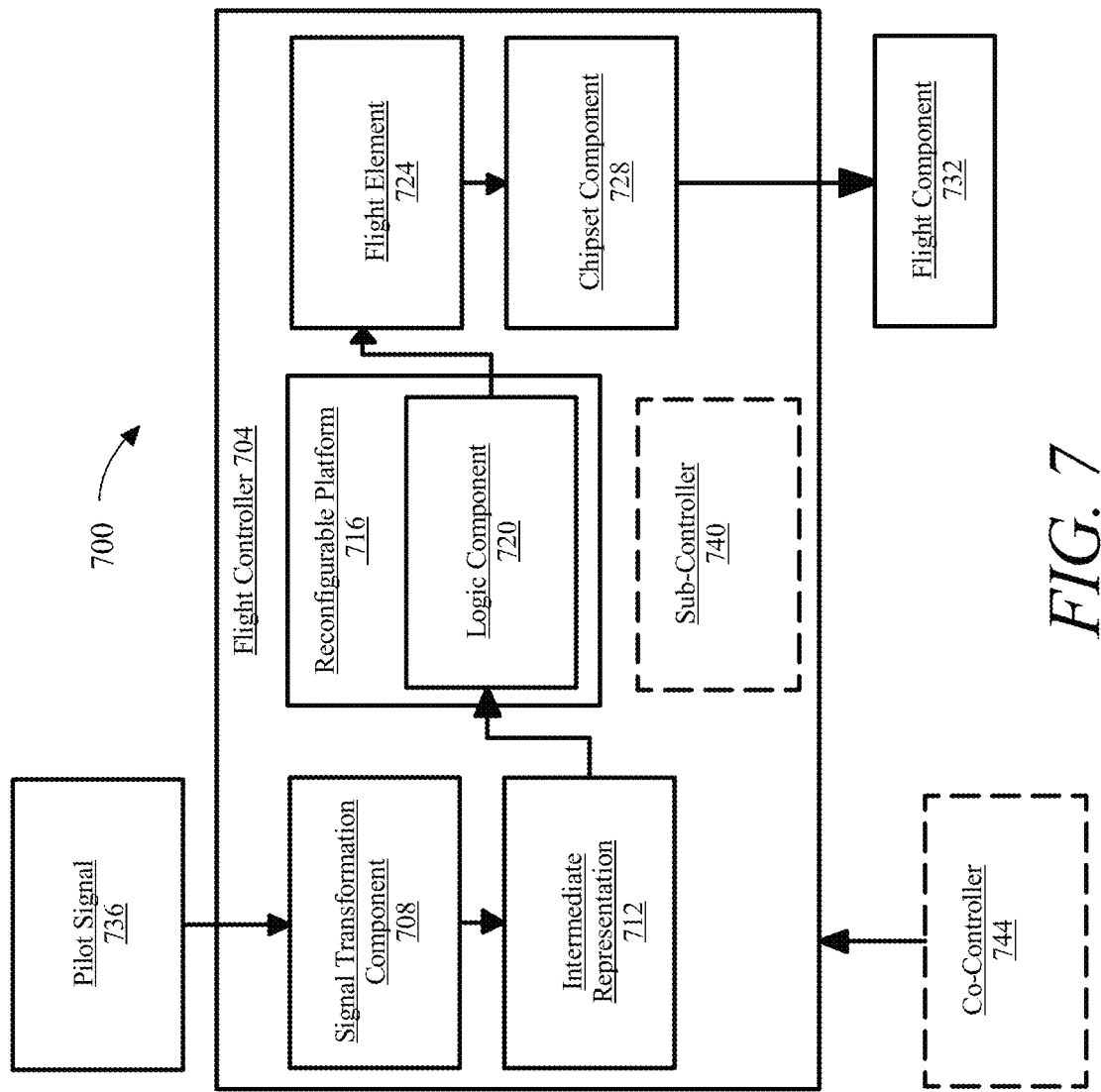
FIG. 7 is a block diagram of an exemplary flight controller.

Now referring to FIG. 7, an exemplary embodiment 700 of a flight controller 704 is illustrated. As used in this disclosure a "flight controller" is a computing device of a plurality of computing devices dedicated to data storage, security, distribution of traffic for load balancing, and flight instruction. Flight controller 704 may include and/or communicate with any computing device as described in this disclosure, including without limitation a microcontroller, microprocessor, digital signal processor (DSP) and/or system on a chip (SoC) as described in this disclosure. Further, flight controller 704 may include a single computing device operating independently, or may include two or more computing device operating in concert, in parallel, sequentially or the like; two or more computing devices may be included together in a single computing device or in two or more computing devices. In embodiments, flight controller 704 may be installed in an aircraft, may control the aircraft remotely, and/or may include an element installed in the aircraft and a remote element in communication therewith.

In an embodiment, and still referring to FIG. 7, flight controller 704 may include a signal transformation component 708. As used in this disclosure a "signal transformation component" is a component that transforms and/or converts a first signal to a second signal, wherein a signal may include one or more digital and/or analog signals. For example, and without limitation, signal transformation component 708 may be configured to perform one or more operations such as preprocessing, lexical analysis, parsing, semantic analysis, and the like thereof. In an embodiment, and without limitation, signal transformation component 708 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 708 may include transforming one or more low-level languages such as, but not limited to, machine languages and/or assembly languages. For example, and without limitation, signal transformation component 708 may include transforming a binary language signal to an assembly language signal. In an embodiment, and without limitation, signal transformation component 708 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 7, signal transformation component 708 may be configured to optimize an intermediate representation 712. As used in this disclosure an "intermediate representation" is a data structure and/or code that represents the input signal. Signal transformation component 708 may optimize intermediate representation as a function of a data-flow analysis, dependence analysis, alias analysis, pointer analysis, escape analysis, and the like thereof. In an embodiment, and without limitation, signal transformation component 708 may optimize intermediate representation 712 as a function of one or more inline expansions, dead code eliminations, constant propagation, loop transformations, and/or automatic parallelization functions. In another embodiment, signal transformation component 708 may optimize intermediate representation as a function of a machine dependent optimization such as a peephole optimization, wherein a peephole optimization may rewrite short sequences of code into more efficient sequences of code. Signal transformation component 708 may optimize intermediate representation to generate an output language, wherein an "output language," as used herein, is the native machine language of flight controller 704. For example, and without limitation, native machine language may include one or more binary and/or numerical languages.

In an embodiment, and without limitation, signal transformation component 708 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 7, flight controller 704 may include a reconfigurable hardware platform 716. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 716 may be reconfigured to enact any algorithm and/or algorithm selection process received from another computing device and/or created using machine-learning processes.

Still referring to FIG. 7, reconfigurable hardware platform 716 may include a logic component 720. As used in this disclosure a "logic component" is a component that executes instructions on output language. For example, and without limitation, logic component may perform basic arithmetic, logic, controlling, input/output operations, and the like thereof. Logic component 720 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 720 may be organized according to Von Neumann and/or Harvard architecture as a non-limiting example. Logic component 720 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 720 may include one or more integrated circuit microprocessors, which may contain one or more central processing units, central processors, and/or main processors, on a single metal-oxide-semiconductor chip. Logic component 720 may be configured to execute a sequence of stored instructions to be performed on the output language and/or intermediate representation 712. Logic component 720 may be configured to fetch and/or retrieve the instruction from a memory cache, wherein a "memory cache," as used in this disclosure, is a stored instruction set on flight controller 704. Logic component 720 may be configured to decode the instruction retrieved from the memory cache to opcodes and/or operands. Logic component 720 may be configured to execute the instruction on intermediate representation 712 and/or output language. For example, and without limitation, logic component 720 may be configured to execute an addition operation on intermediate representation 712 and/or output language.

In an embodiment, and without limitation, logic component 720 may be configured to calculate a flight element 724. As used in this disclosure a "flight element" is an element of datum denoting a relative status of aircraft. For example, and without limitation, flight element 724 may denote one or more torques, thrusts, airspeed velocities, forces, altitudes, groundspeed velocities, directions during flight, directions facing, forces, orientations, and the like thereof. For example, and without limitation, flight element 724 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 724 may denote that aircraft is following a flight path accurately and/or sufficiently.

Still referring to FIG. 7, flight controller 704 may include a chipset component 728. As used in this disclosure a "chipset component" is a component that manages data flow. In an embodiment, and without limitation, chipset component 728 may include a northbridge data flow path, wherein the northbridge dataflow path may manage data flow from logic component 720 to a high-speed device and/or component, such as a RAM, graphics controller, and the like thereof. In another embodiment, and without limitation, chipset component 728 may include a southbridge data flow path, wherein the southbridge dataflow path may manage data flow from logic component 720 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 728 may manage data flow between logic component 720, memory cache, and a flight component 732. As used in this disclosure a "flight component" is a portion of an aircraft that can be moved or adjusted to affect one or more flight elements. In some cases, an aircraft component may include a flight component. For example, flight component 732 may include a component used to affect the aircrafts' roll and pitch which may comprise one or more ailerons. As a further example, flight component 732 may include a rudder to control yaw of an aircraft. In an embodiment, chipset component 728 may be configured to communicate with a plurality of flight components as a function of flight element 724. For example, and without limitation, chipset component 728 may transmit to an aircraft rotor to reduce torque of a first lift propulsor and increase the forward thrust produced by a pusher component to perform a flight maneuver.

In an embodiment, and still referring to FIG. 7, flight controller 704 may be configured generate an autonomous function. As used in this disclosure an "autonomous function" is a mode and/or function of flight controller 704 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 724. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 704 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 704 will control the ailerons and/or rudders. As used in this disclosure "non-autonomous mode" is a mode that denotes a pilot will control aircraft and/or maneuvers of aircraft in its entirety.

In an embodiment, and still referring to FIG. 7, flight controller 704 may generate autonomous function as a function of an autonomous machine-learning model. As used in this disclosure an "autonomous machine-learning model" is a machine-learning model to produce an autonomous function output given flight element 724 and a pilot signal 736 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 736 may denote that a pilot is controlling and/or maneuvering ailerons, wherein the pilot is not in control of the rudders and/or propulsors. In an embodiment, pilot signal 736 may include an implicit signal and/or an explicit signal. For example, and without limitation, pilot signal 736 may include an explicit signal, wherein the pilot explicitly states there is a lack of control and/or desire for autonomous function. As a further non-limiting example, pilot signal 736 may include an explicit signal directing flight controller 704 to control and/or maintain a portion of aircraft, a portion of the flight plan, the entire aircraft, and/or the entire flight plan. As a further non-limiting example, pilot signal 736 may include an implicit signal, wherein flight controller 704 detects a lack of control such as by a malfunction, torque alteration, flight path deviation, and the like thereof. In an embodiment, and without limitation, pilot signal 736 may include one or more explicit signals to reduce torque, and/or one or more implicit signals that torque may be reduced due to reduction of airspeed velocity. In an embodiment, and without limitation, pilot signal 736 may include one or more local and/or global signals. For example, and without limitation, pilot signal 736 may include a local signal that is transmitted by a pilot and/or crew member. As a further non-limiting example, pilot signal 736 may include a global signal that is transmitted by air traffic control and/or one or more remote users that are in communication with the pilot of aircraft. In an embodiment, pilot signal 736 may be received as a function of a tri-state bus and/or multiplexor that denotes an explicit pilot signal should be transmitted prior to any implicit or global pilot signal.

Still referring to FIG. 7, autonomous machine-learning model may include one or more autonomous machine-learning processes such as supervised, unsupervised, or reinforcement machine-learning processes that flight controller 704 and/or a remote device may or may not use in the generation of autonomous function. As used in this disclosure "remote device" is an external device to flight controller 704. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 7, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 704 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 7, flight controller 704 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 704. Remote device and/or FPGA may transmit a signal, bit, datum, or parameter to flight controller 704 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 704 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 7, flight controller 704 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 7, flight controller 704 may include, but is not limited to, for example, a cluster of flight controllers in a first location and a second flight controller or cluster of flight controllers in a second location. Flight controller 704 may include one or more flight controllers dedicated to data storage, security, distribution of traffic for load balancing, and the like. Flight controller 704 may be configured to distribute one or more computing tasks as described below across a plurality of flight controllers, which may operate in parallel, in series, redundantly, or in any other manner used for distribution of tasks or memory between computing devices. For example, and without limitation, flight controller 704 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 7, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 732. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 7, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 704. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 712 and/or output language from logic component 720, wherein output language may include one or more analog-to-digital conversions, low bit rate transmissions, message encryptions, digital signals, binary signals, logic signals, analog signals, and the like thereof described above in detail.

Still referring to FIG. 7, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 7, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 7, flight controller 704 may also be implemented using a "shared nothing" architecture in which data is cached at the worker, in an embodiment, this may enable scalability of aircraft and/or computing device. Flight controller 704 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 7, flight controller may include a sub-controller 740. As used in this disclosure a "sub-controller" is a controller and/or component that is part of a distributed controller as described above; for instance, flight controller 704 may be and/or include a distributed flight controller made up of one or more sub-controllers. For example, and without limitation, sub-controller 740 may include any controllers and/or components thereof that are similar to distributed flight controller and/or flight controller as described above. Sub-controller 740 may include any component of any flight controller as described above. Sub-controller 740 may be implemented in any manner suitable for implementation of a flight controller as described above. As a further non-limiting example, sub-controller 740 may include one or more processors, logic components and/or computing devices capable of receiving, processing, and/or transmitting data across the distributed flight controller as described above. As a further non-limiting example, sub-controller 740 may include a controller that receives a signal from a first flight controller and/or first distributed flight controller component and transmits the signal to a plurality of additional sub-controllers and/or flight components.

Still referring to FIG. 7, flight controller may include a co-controller 744. As used in this disclosure a "co-controller" is a controller and/or component that joins flight controller 704 as components and/or nodes of a distributer flight controller as described above. For example, and without limitation, co-controller 744 may include one or more controllers and/or components that are similar to flight controller 704. As a further non-limiting example, co-controller 744 may include any controller and/or component that joins flight controller 704 to distributer flight controller. As a further non-limiting example, co-controller 744 may include one or more processors, logic components and/or computing devices capable of receiving, processing, and/or transmitting data to and/or from flight controller 704 to distributed flight control system. Co-controller 744 may include any component of any flight controller as described above. Co-controller 744 may be implemented in any manner suitable for implementation of a flight controller as described above.

In an embodiment, and with continued reference to FIG. 7, flight controller 704 may be designed and/or configured to perform any method, method step, or sequence of method steps in any embodiment described in this disclosure, in any order and with any degree of repetition. For instance, flight controller 704 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 8:
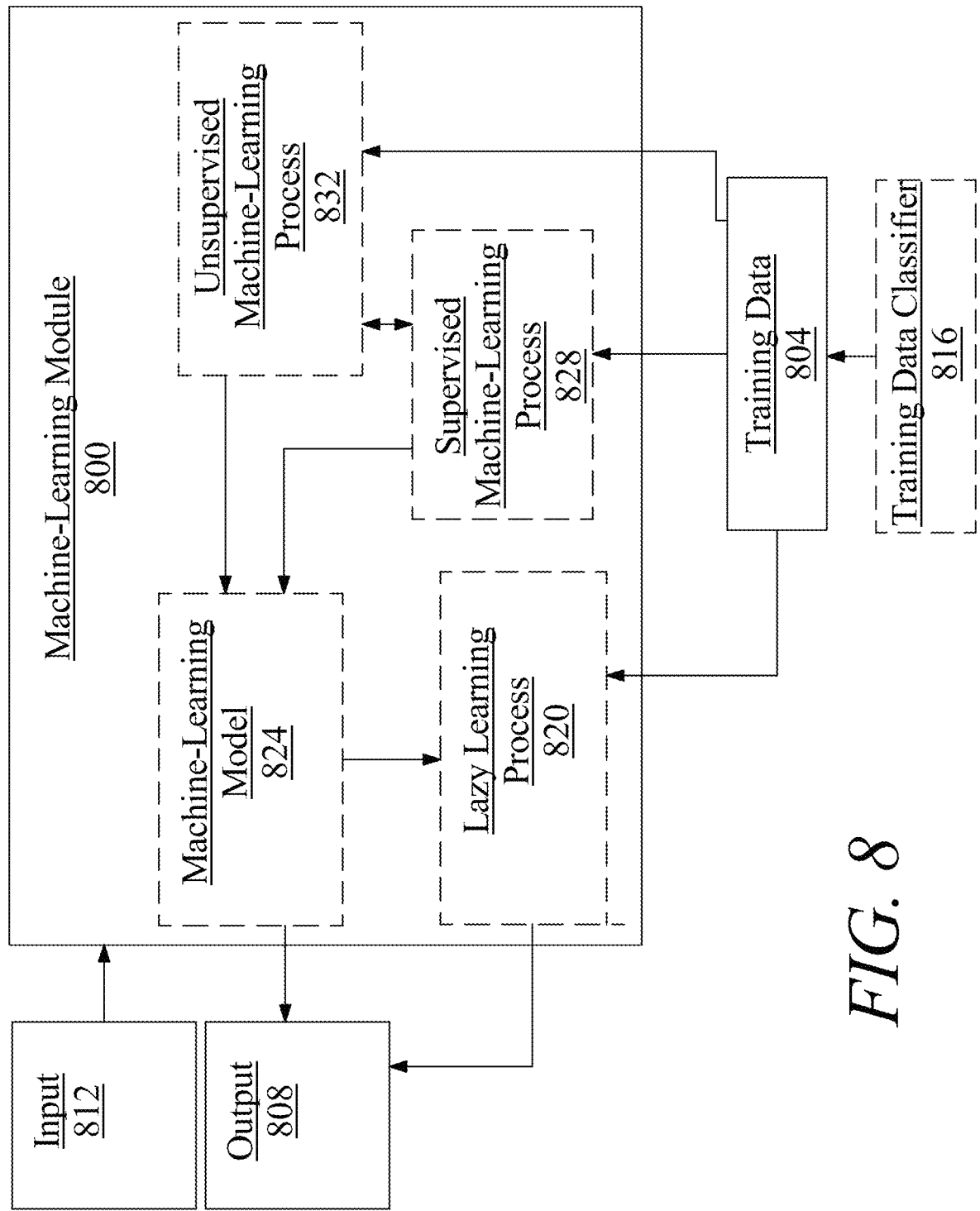
FIG. 8 is a block diagram illustrating an exemplary machine-learning process.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure. As a non-limiting illustrative example flight elements and/or pilot signals may be inputs, wherein an output may be an autonomous function.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a processes whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 9:
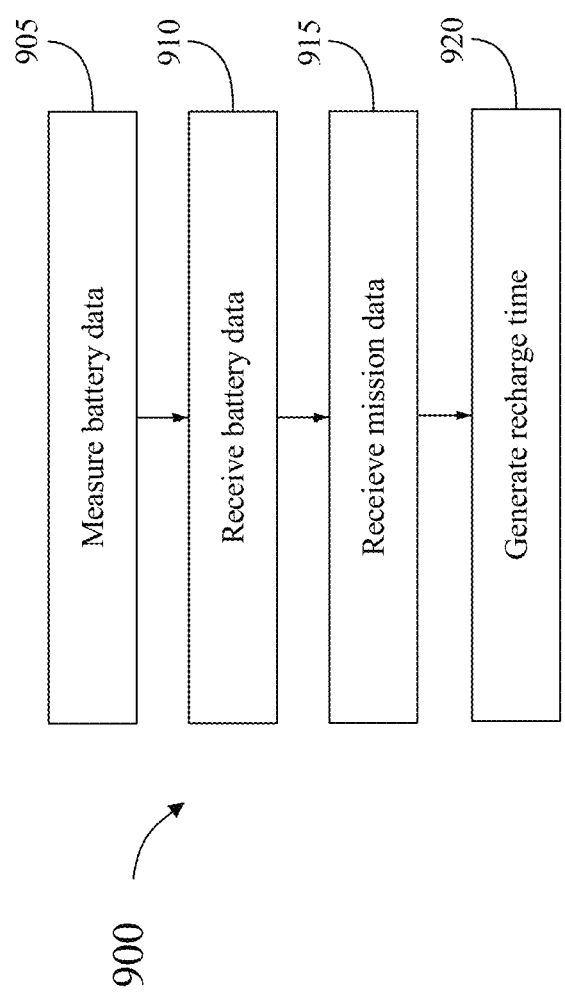
FIG. 9 is a flow diagram depicting an exemplary method of optimizing battery recharge management for use with an electric vertical take-off and landing aircraft.

Referring now to FIG. 9A, in some cases, recharge time 140 may be generated by estimating a needed depth of charge for a flight mission. Based a planned flight mission and/or mission data 132 server may determine a desired depth of charge of at least a battery 112. Exemplary embodiments of graphs representing power capability vs. depth of charge is presented. There are two distinct graphical representations of the values discussed herein. Referring specifically to graph 904, the y-axis is Power Capability measured in Watts (W) and the x-axis is Depth of Discharge. Graph 904 represents two energy storage elements as represented by the two curves in the field of the graph. One of ordinary skill in the art would appreciate that the two curves represent two energy storage elements discharge uniformly. For the purposes of this disclosure, "uniform discharge" is the flow of energy out of an energy storage element at the same rate measured in one or more electrical parameters such as current or voltage, among others. The vertical line represents a certain depth of discharge and the intersection with the curves shows the relative power capability of the two energy storage elements. It may be readily seen from graph 904 that the power capability of the two energy storage elements may not be equal at the same depth of discharge. For the purposes of this disclosure, "depth of discharge" is the amount of energy depleted from an energy storage element. For example, a greater depth of discharge leaves less energy remaining in the energy storage element than a lesser depth of discharge. The energy storage element may be consistent with any energy storage element as described in this disclosure.

With continued reference to FIG. 9A, graph 908 is presented representing two curves measuring Power Capability (W) versus Depth of Discharge. As one of ordinary skill in the art would appreciate, the two curves in the field of graph 908 represented biased, or uneven discharge of two energy storage elements. The biased discharge may be biased as a function of modulation of one or more electrical commands as described in this disclosure. When biased discharging is utilized, two different depth of charges of the two energy storage elements renders the same power capability of the two energy storage elements. That is to say that although one energy storage element undergoes a greater depth of discharge, the same power capability may be seen from the two energy storage elements. Biased discharge may be a function of pilot commands, one or more computing devices, elements of data generated by any of the systems and methods as described in this disclosure, machine-learning processes, optimization processes, emergency procedures, a combination thereof, or the like.

Referring now to FIG. 9B, according to some embodiments, mission data 132 may be used to generate an anticipated mission power demand. Graph 912 is presented representing Mission Power Demand on the y-axis and Time into Mission on the x-axis. There are three curves shown in the field of graph 912. The closed cross tie curve 916 represents the power demanded by the plurality of propulsors from the plurality of energy storage elements during various phases of flight (e.g. the mission) including take-off, climb, cruise, descent, and landing. One of ordinary skill in the art would appreciate that graph 912 represents conventional take-off and landing electric vehicles, such as the aircraft described herein below in one of its dual modes. First open cross tie curve 920 and second open cross tie curve 924 represent the power demanded by the plurality of propulsors from a first and second portion of energy storage elements, respectively, over various phases of flight (e.g. the mission). First open cross tie curve 920 demands less power in all phases of flight than closed cross tie curve 916. One of ordinary skill in the art would appreciate that modulating the command for discharge of the first and second energy storage elements (as shown by the repeating pattern in the "cruise" section of graph 912 consistent with the description herein produces a varying and opposite power demand in first open cross tie curve 920 and second open cross tie curve 436. In other words, modulating the demand for power of a first energy storage element produces an opposite demand in a second energy storage element.

With continued reference to FIG. 9B, graph 912 may include a power demand for each propulsor of the plurality of propulsors as described in this disclosure. a power demand of each propulsor of a plurality of propulsors may be calculated for at least a future phase of flight. Power demand may be calculated using one or more of various factors, including without limitation manufacture supplied data for propulsor, engine and/or motor. In an embodiment, factors used to calculate the power demand calculation may use weight and/or payload of aircraft in addition to manufacturing data. Power demand, as a non-limiting example, may be a function of such elements as a required speed of the propulsor for any phase of flight, weight or payload, altitude, temperature, weather, environmental conditions, and/or size, type and or shape of a propeller blade, rotor blade, and/or other propulsor blade. Power demand may alternatively or additionally, without limitation, be a function of a type, size and age of one or more motors driving or incorporated in plurality of propulsors. As a non-limiting example, power demand may be calculated for a portion of the flight and/or the entire phase of a flight, flight plan, or mission. As another example and without limitation, power demand of at least a propulsor of a plurality of propulsors, at a point of time or for the remaining time of the particular phase of flight may be calculated. As another example and without limitation, power demand may be calculated for each individual propulsor during a phase of flight or for the entire flight plan. As another example and without limitation, power demand may be calculated for the plurality of propulsors and divided by the number of propulsors for a phase of flight of the entire flight plan. As another example and without limitation, power demand for an individual propulsor or a plurality of propulsors may be done at any part of the flight or flight plan and may be done multiple times during flight or the mission.

Figure 10:
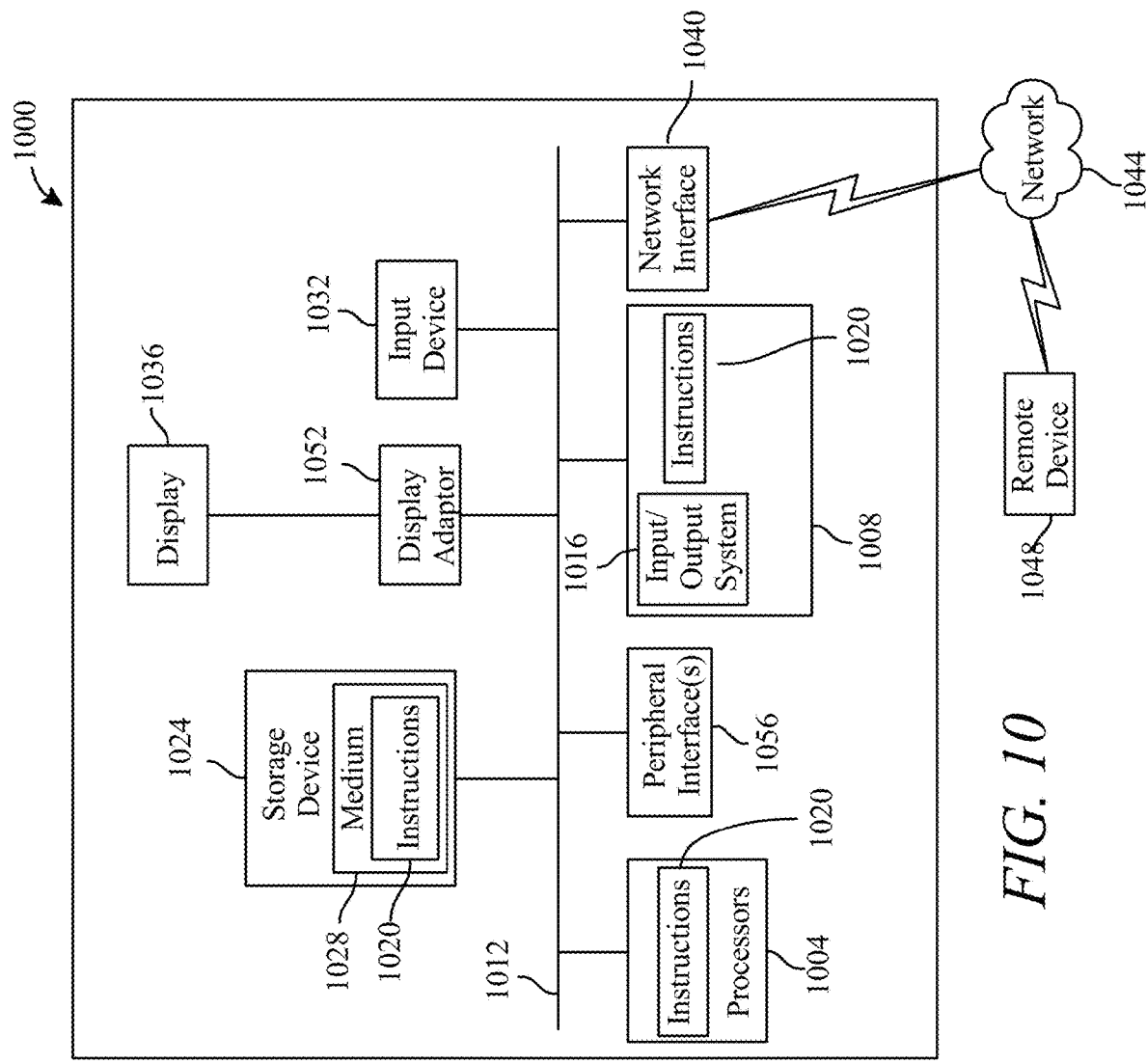
FIG. 10 is a block diagram of a computing system that can be used to implement any one or more of the methodologies disclosed herein and any one or more portions thereof.

Referring now to FIG. 10, an exemplary method 1000 of A optimizing battery recharge management for use with an electric vertical take-off and landing aircraft is illustrated by way of a flow diagram. At step 1005, at least a sensor associated with at least a battery mechanically coupled to an electric vertical take-off and landing (eVTOL) aircraft measures battery data associated with the at least a battery. In some cases, at least a battery includes a plurality of battery cells. Sensor may include any sensor described in this disclosure, including with reference to FIGS. 1-9B. Battery may include any battery described in this disclosure, including with reference to FIGS. 1-9B. Battery cells may include any battery cells described in this disclosure, including with reference to FIGS. 1-9B. eVTOL aircraft may include any eVTOL aircraft described in this disclosure, including with reference to FIGS. 1-9B. In some embodiments, eVTOL aircraft may include at least a pilot control.

With continued reference to FIG. 10, at step 1010, a server remote from eVTOL aircraft and in communication with at least a sensor receives battery data. Server may include any server or computing device described in this disclosure, including with reference to FIGS. 1-9B and FIG. 10.

With continued reference to FIG. 10, at step 1015, server receives mission data associated with a planned flight mission of eVTOL aircraft. Planned flight mission may include any planned flight mission described in this disclosure, including with reference to FIGS. 1-9B. In some embodiments, step 1015 may additionally receiving mission data from a remote device. Remove device may include any remote device or computing device described in this disclosure, including with reference to FIGS. 1-9B.

With continued reference to FIG. 10, at step 1020, server generates a recharge time as a function of battery data and mission data. Recharge time may include any recharge described in this disclosure, including with reference to FIGS. 1-9B. In some embodiments, step 1020 may additionally include generating recharge time as a function of a battery degradation metric. In some cases, step 1020 may additionally include generating battery degradation metric as a function of battery data. In some embodiments, recharge time may include a battery cooling time. In some cases, step 1020 may additionally include generating battery cooling time as a function of at least a thermal model. In some embodiments, step 1020 may additionally include generating recharge time as a function of a machine-learning process. Machine-learning process may include any machine-learning process described in this disclosure, including with reference to FIGS. 1-9B.

Still referring to FIG. 10, in some embodiments, method 1000 may additionally include at least a network providing a communicative connection between eVTOL aircraft and server. Communicative connection may include any communicative connection described in this disclosure, including with reference to FIGS. 1-9B. In some cases, at least a network may include a wireless network.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for optimizing battery recharge management for use with an electric vertical take-off and landing aircraft, the system comprising:
an electric vertical take-off and landing (eVTOL) aircraft comprising:
at least a battery mechanically coupled to the eVTOL aircraft and configured to power at least an aircraft component of the eVTOL aircraft, wherein the at least a battery comprises a plurality of battery cells; and
at least a sensor, configured to measure battery data associated with the at least a battery; and
a server remote from the eVTOL aircraft and in communication with the at least a sensor, wherein the server is configured to:
receive the battery data from the at least a sensor;
receive mission data associated with a planned flight mission of the eVTOL aircraft; and
generate a recharge time as a function of the battery data and the mission data, wherein the recharge time includes a battery cooling time.

2. The system of claim 1 wherein the server is further configured to generate the recharge time as a function of a battery degradation metric.

3. The system of claim 2, wherein the server is further configured to generate the battery degradation metric as a function of the battery data.

4. The system of claim 1, wherein the eVTOL aircraft further comprises at least a pilot control.

5. The system of claim 1, wherein the server is configured to generate the battery cooling time as a function of at least a thermal model.

6. The system of claim 1, wherein the server is further configured to receive the mission data from a remote device.

7. The system of claim 1, wherein the server is configured to generate the recharge time as a function of a machine-learning process.

8. The system of claim 1, further comprising at least a network configured to provide a communicative connection between the at least a sensor and the server.

9. The system of claim 8, wherein the at least a network comprises a wireless network.

10. A method of optimizing battery recharge management for use with an electric vertical take-off and landing aircraft, the method comprising:
measuring, using at least a sensor associated with at least a battery mechanically coupled to an electric vertical take-off and landing (eVTOL) aircraft, battery data associated with the at least a battery, wherein the at least a battery comprises a plurality of battery cells;
receiving, using a server remote from the eVTOL aircraft and in communication with the at least a sensor, the battery data;
receiving, using the server, mission data associated with a planned flight mission of the eVTOL aircraft; and generating, using the server, a recharge time as a function of the battery data and the mission data, wherein the recharge time includes a battery cooling time.

11. The method of claim 10 wherein generating the recharge time further comprises generating the recharge time as a function of a battery degradation metric.

12. The method of claim 11, wherein generating the recharge time further comprises generating the battery degradation metric as a function of the battery data.

13. The method of claim 10, wherein the eVTOL aircraft further comprises at least a pilot control.

14. The method of claim 10, further comprising generating, using the server, the battery cooling time as a function of at least a thermal model.

15. The method of claim 10, wherein receiving the mission data further comprises receiving the mission data from a remote device.

16. The method of claim 10, wherein generating the recharge time further comprises generating the recharge time as a function of a machine-learning process.

17. The method of claim 10, further comprising providing, using at least a network, a communicative connection between the eVTOL aircraft and the server.

18. The method of claim 17, wherein the at least a network comprises a wireless network.

* * * * *